United States Patent [19]

Ezekoye et al.

[11] 4,125,125
[45] Nov. 14, 1978

[54] PINCH VALVE CONSTRUCTION

[75] Inventors: Levi I. Ezekoye, 1106 Wood St., Pittsburgh, Pa. 15243; Spiros G. Raftis, Pittsburgh, Pa.

[73] Assignee: Levi I. Ezekoye, Pittsburgh, Pa.; a part interest

[21] Appl. No.: 682,512

[22] Filed: May 3, 1976

[51] Int. Cl.² ............................................. F16K 43/00
[52] U.S. Cl. ........................................ 137/315; 251/5; 251/61.1
[58] Field of Search ............... 137/315; 251/4, 5, 61.1

[56] References Cited

U.S. PATENT DOCUMENTS

| 3,159,373 | 12/1964 | Kroffke | 251/5 |
| 3,272,470 | 9/1966 | Bryant | 251/5 |
| 3,371,677 | 3/1968 | Connolly | 251/5 |
| 3,396,448 | 8/1968 | Kisling | 251/5 |
| 3,441,245 | 4/1969 | Holland et al. | 251/5 |
| 3,445,085 | 5/1969 | Eckel et al. | 251/5 |
| 3,483,892 | 12/1969 | Sugimura et al. | 251/5 |
| 3,838,704 | 10/1974 | Johnson | 251/5 |

Primary Examiner—Martin P. Schwadron
Assistant Examiner—G. L. Walton
Attorney, Agent, or Firm—Kirschstein, Kirschstein, Ottinger & Cobrin

[57] ABSTRACT

An improved pinch valve construction wherein the pinch valve sleeve can be removed as required while the pinch valve construction is connected to mating pipe with there being no leakage of the fluid to the environment.

7 Claims, 6 Drawing Figures

PINCH VALVE CONSTRUCTION

FIELD OF THE INVENTION

An improved pinch valve construction wherein said valve construction can be welded, bolted or threaded to mating pipe and wherein the pinch valve sleeve in the pinch valve construction can be removed as required while the pinch valve construction is connected to the mating pipe.

DESCRIPTION OF THE PRIOR ART

Typically a pinch valve construction includes an elastomeric pinch valve sleeve. The pinch valve sleeve is generally cylindrical in construction and includes opposed flanges at the opposite end of said sleeve. The flanges are fastened to an adjacent pipe section and the sleeve is surrounded by a valve casing. A nipple in the valve casing allows a fluid (either liquid or air) to constrict the pinch valve sleeve and thereby control the flow of fluid therethrough. Alternatively, a mechanical actuator is used to control the pinching of the pinch valve sleeve.

Normally, a pinch valve sleeve is made from pure gum rubber, neoprene, BUNA, butyl, hypalon, urethane, viton, EPT (nordel), silicone and food grade rubber.

Pinch valve constructions, as generally described herein, have been used in a wide variety of situations. More specifically, pinch valve constructions as described herein have been used in controlling the flow of, by way of example, solids in suspension (either in slurry or air-conveyed form), abrasive materials such as metallic ores, asbestos fibers, sand, coal, sugar, wood chips, pulps, paper stock, plastic pellets, raw sewage, talc, cement, fly ash, various chemicals and foodstuffs.

While the aforementioned pinch valve constructions are extremely useful in various situations, they are not satisfactory when controlling the flow of radioactive fluids. When dealing with radioactive fluids, it is absolutely essential that there be no leakage of the fluid to the environment. While leakage is not a severe problem in normal use, it is obvious that when dealing with radioactive fluids it is a significant problem.

It is also desirable to be able to remove a pinch valve sleeve and/or install a pinch valve sleeve without removing the valve construction from the pipeline.

SUMMARY OF THE INVENTION

1. Purposes of the Invention

It is an object of the present invention to provide an improved pinch valve construction.

Still another object of the present invention is to provide an improved pinch valve construction wherein leakage of the fluid being transported through the valve sleeve is prevented.

A further object of the present invention is to provide an improved pinch valve construction wherein the pinch valve sleeve can be removed from the pinch valve construction when said pinch valve construction is mated to a pipe.

A further object of the present invention is to provide a pinch valve construction that can be welded to a pipe section.

Still another object of the present invention is to provide a pinch valve construction wherein leakages from the pinch valve sleeve are contained in a chamber rather than exposed to the environment.

A further object of the present invention is to provide a pinch valve construction wherein the pinch valve sleeve flange is not attached to an adjacent pipe section when said pinch valve construction is secured to said adjacent pipe section.

Another object of the present invention is to provide an improved pinch valve construction which is particularly suitable for controlling the flow of radioactive fluids.

These and other objects and advantages of the present invention will become evident from the description which follows.

2. Brief Description of the Invention

According to the present invention, the foregoing as well as other objects are accomplished by an improved pinch valve construction which includes an elastomeric pinch valve sleeve having an elongated central opening. The pinch valve sleeve includes opposed flanges. Each flange includes a flat surface which faces away from the pinch valve sleeve center and an annular stub which faces toward the remaining flange. The pinch valve sleeve is surrounded by a valve sleeve jacket which is threaded for a portion of its length.

Two annular thrust washers are provided. Each thrust washer includes a receptacle for a flange stub. The first thrust washer is positioned to receive the stub of a first of the flanges and abuts against the threaded valve sleeve jacket. In a similar fashion, the remaining thrust washer receives the stub of the remaining flange and is positioned adjacent the threaded valve sleeve jacket. A nut circumscribes the threaded valve sleeve jacket and is in engagement therewith.

Means is provided to prevent the valve sleeve jacket from rotating.

A radial fluid passage extends through said threaded valve sleeve jacket.

A housing is provided for the pinch valve sleeve. The housing includes a cover plate. A nipple extends through the cover plate and a fluid line can be attached thereto. The housing can be welded to adjacent pipe sections as required.

When it is desired to remove a pinch valve sleeve, the cover plate is removed and the valve sleeve, washers, threaded valve sleeve jacket and nut are removed and replaced as required.

In normal use, the nut is backed off the threaded pinch valve sleeve jacket such that the nut abuts one thrust washer and the threaded valve sleeve jacket abuts the remaining thrust washer, thereby forcing the flanges of the pinch valve sleeve against the valve housing thereby providing a fluid-tight seal. Fluid directed to the interior of the valve housing, which in effect is a fluid chamber, passes through the radial opening in the threaded pinch valve sleeve, thereby constricting the pinch valve sleeve and controlling the flow of fluid through said pinch valve sleeve. The amount of constriction of the pinch valve sleeve is controlled by the pressure of the fluid directed about said pinch valve sleeve.

Alternatively, a mechanical actuating means can be used for constricting the pinch valve sleeve as required to modulate the flow therethrough.

The invention accordingly consists in the features of construction, combination of elements, and arrangement of parts which will be exemplified in the device hereinafter described and of which the scope of application will be indicated in the appended claims.

BRIEF DESCRIPTION OF THE DRAWINGS

In the drawings wherein like parts are given the same reference numerals.

DESCRIPTION OF THE PREFERRED EMBODIMENTS

Figure 1:
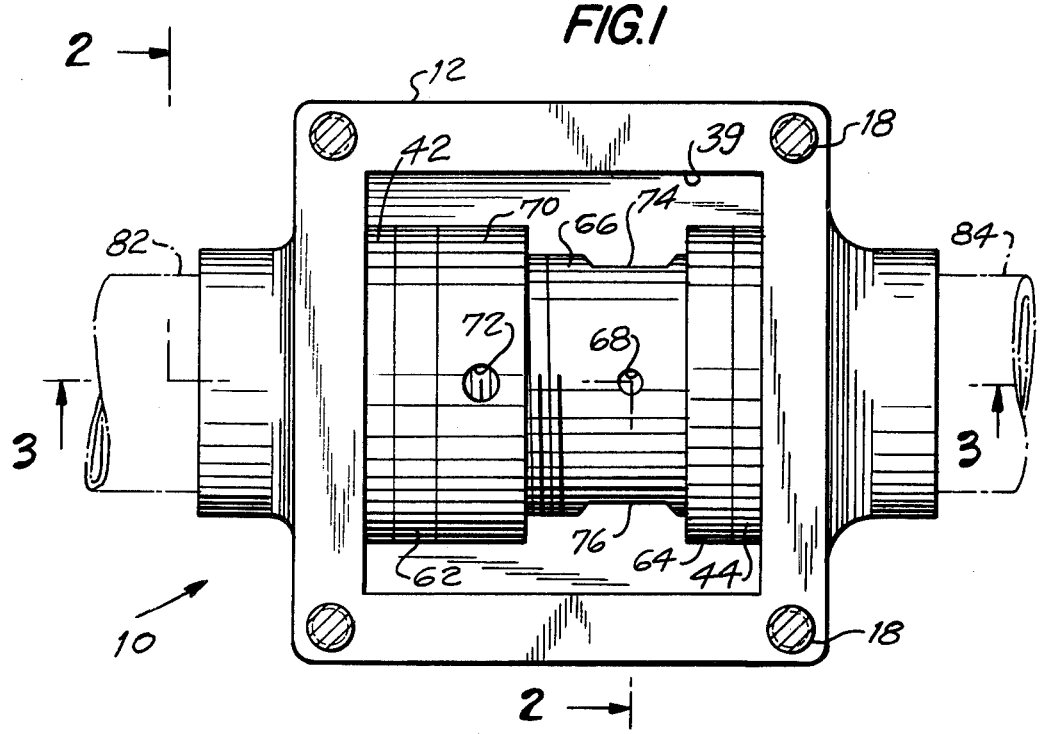
FIG. 1 is a front plan view of a pinch valve construction according to the present invention.
Figure 2:
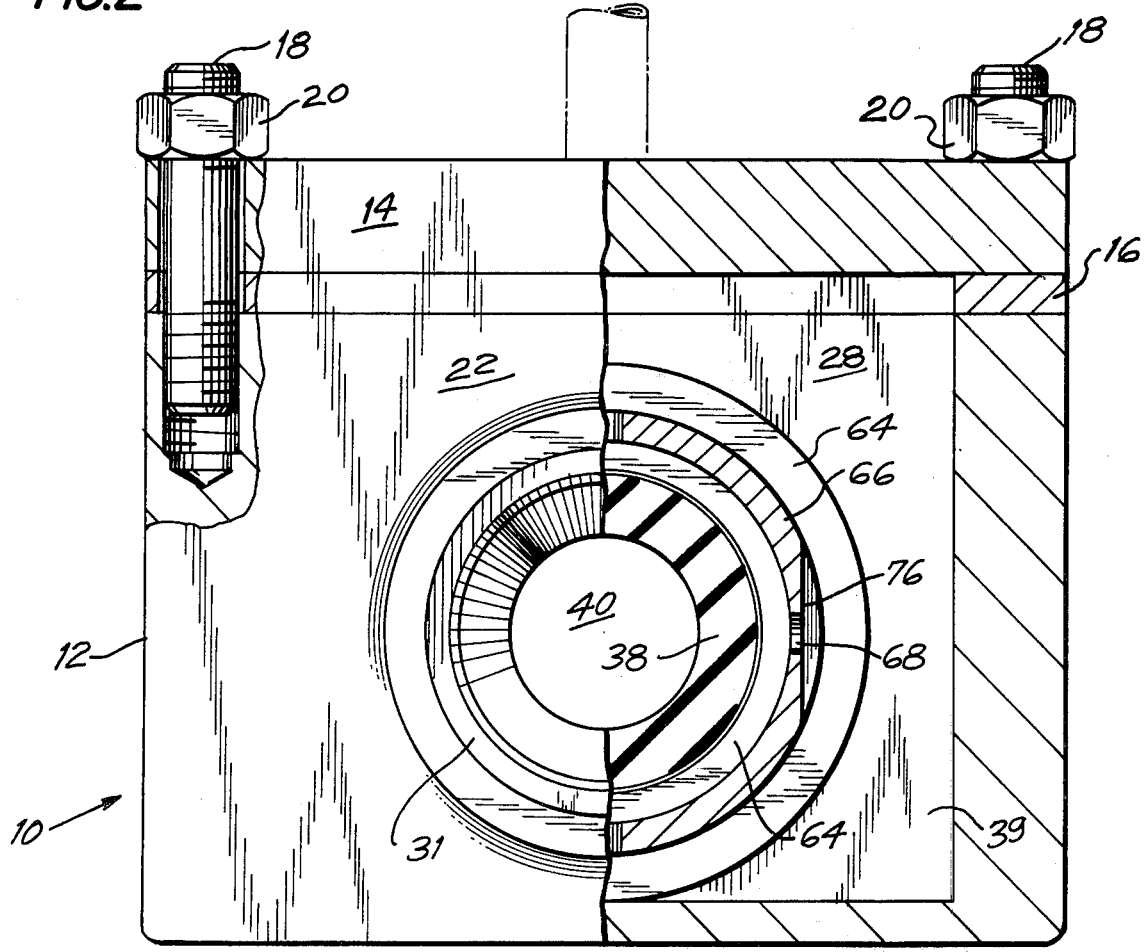
FIG. 2 is an enlarged sectional view taken along the line 2—2 of FIG. 1.

In the drawings a pinch valve construction 10 is shown which includes a valve housing 12. A valve cover 14 is provided and cooperates with valve housing 12 as will hereinafter be described. Valve housing 12 is open on the top and closed on the sides and bottom. Extending through the four corners of the upper top end of valve housing 12 are four tapped holes. Located adjacent the upper end of valve housing 12 is a gasket 16. Four bolt clearance holes extend through valve cover 14, and are in registry with the tapped holes in valve housing 12.

Four bolts 18 are provided and extend through the bolt clearance holes in valve cover 14 through gasket 16 and are in threaded engagement with the respective tapped holes in valve housing 12. Nuts 20 are provided for each bolt. Thus it can be seen that nuts 20 can be unscrewed from the respective bolts whereby the valve cover 14 can be removed from valve housing 12.

Figure 3:
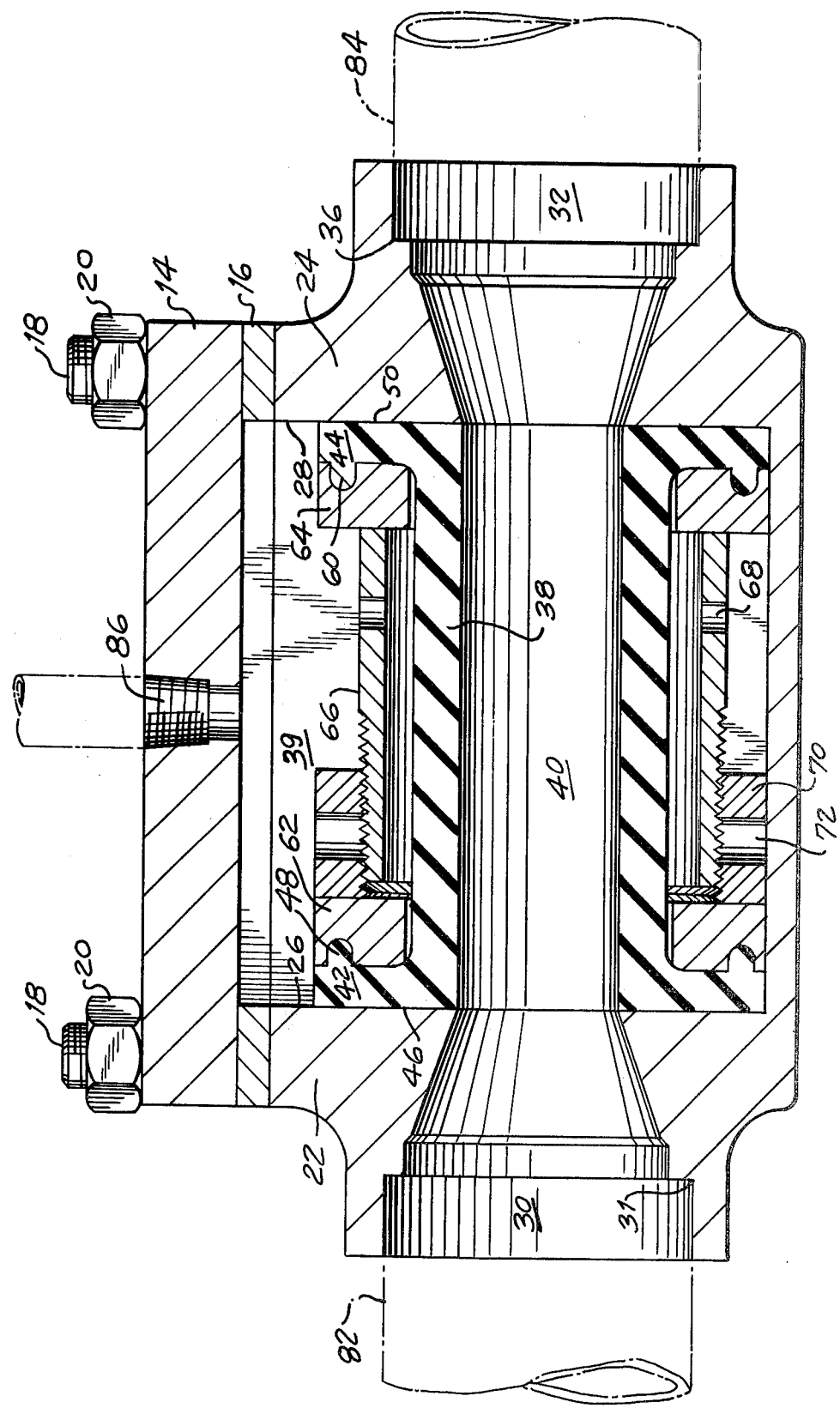
FIG. 3 is an enlarged sectional view taken substantially along the line 3—3 of FIG. 1.

Valve housing 12 includes opposed ends 22 and 24 (best seen in FIG. 3). Adjacent end 22 is a flat face 26 which is parallel and opposed to flat face 28 at end 24. A stepped opening (pipe receptacle) 30 is located in end 22 and includes a shoulder 31 for receiving a pipe section. A similar stepped opening 32 is located in end 34 and includes a shoulder 36 for receiving a further section of pipe.

An elastomeric pinch valve sleeve 38 is located in chamber 39 within the interior of valve housing 12 and is generally cylindrical with a central passage 40 and includes opposed flanges 42 and 44. Pinch valve sleeve 38 can be constructed from pure gum rubber, neoprene, BUNA, butyl, hypalon, urethane, viton, EPT (nordel), silicone and food grade rubber, as well as other materials that will be apparent to those skilled in the art.

Flange 42 includes an end face 46 which abuts face 26 of valve housing 12. An annular stub 48 projects away from flange 44 near the periphery thereof. Flange 44 includes a flat face 50 which abuts flat face 28 of end 24 of valve housing 12. A further annular stub 60 is provided which extends toward stub 48.

A first thrust washer 62 is provided which is annular and includes an indentation which receives stub 48. Thrust washer 62 circumscribes a portion of pinch valve sleeve 38. A second thrust washer 64 is provided which includes an annular indentation which receives stub 60. Thrust washer 64 circumscribes a portion of pinch valve sleeve 38.

Surrounding the central portion of pinch valve sleeve 38 is a partially threaded valve sleeve jacket 66. Threaded valve sleeve jacket 66 includes a fluid passageway 68. Threaded valve sleeve jacket 66 circumscribes the central portion of pinch valve sleeve 38 with there being a gap between the internal surface of the threaded valve sleeve and the external surface of the central portion of pinch valve sleeve 38. It should be noted that the length of threaded valve sleeve jacket 66 is slightly less than the distance between the thrust washers 62 and 64.

A nut 70 is provided which is in threaded engagement with a portion of threaded valve sleeve jacket 66. Nut 70 includes opposed spanner holes 72 whereby a spanner may grip nut 70 to rotate the same.

Threaded valve sleeve jacket 66 includes indented flat opposed sections 74 and 76. Valve housing 12 includes shoulder guides 78 and 80 which extend inwardly and are in close proximity to flat faces 74 and 76, respectively, of threaded valve sleeve jacket 66 thereby preventing the threaded valve sleeve jacket from rotating.

In normal use a pipe section 82 is received in receptacle 30 and can be welded thereto. This ensures an excellent fit and increases the load that the valve construction can carry. In a similar fashion a further pipe section 84 is welded to receptacle 32.

If it is desired to place a pinch valve sleeve thrust washer, threaded valve sleeve jacket and nut in the interior of valve housing 12, valve cover 14 is removed from said valve housing by unscrewing nuts 20. Pinch valve sleeve 38 is positioned as shown in FIG. 3—i.e., so that the pinch valve sleeve is in the lower portion of valve housing 12 with opposed faces 46 and 50 abutting faces 26 and 28, respectively, of valve housing 12. A spanner is used to tighten nut 70 so that said nut abuts thrust washer 62 and at the same time nut 70 is tightened threaded valve sleeve jacket 66 restrained from rotating by 78 and 80 is caused to move to the right as seen in FIG. 3, thereby abutting thrust washer 64.

Figure 4:
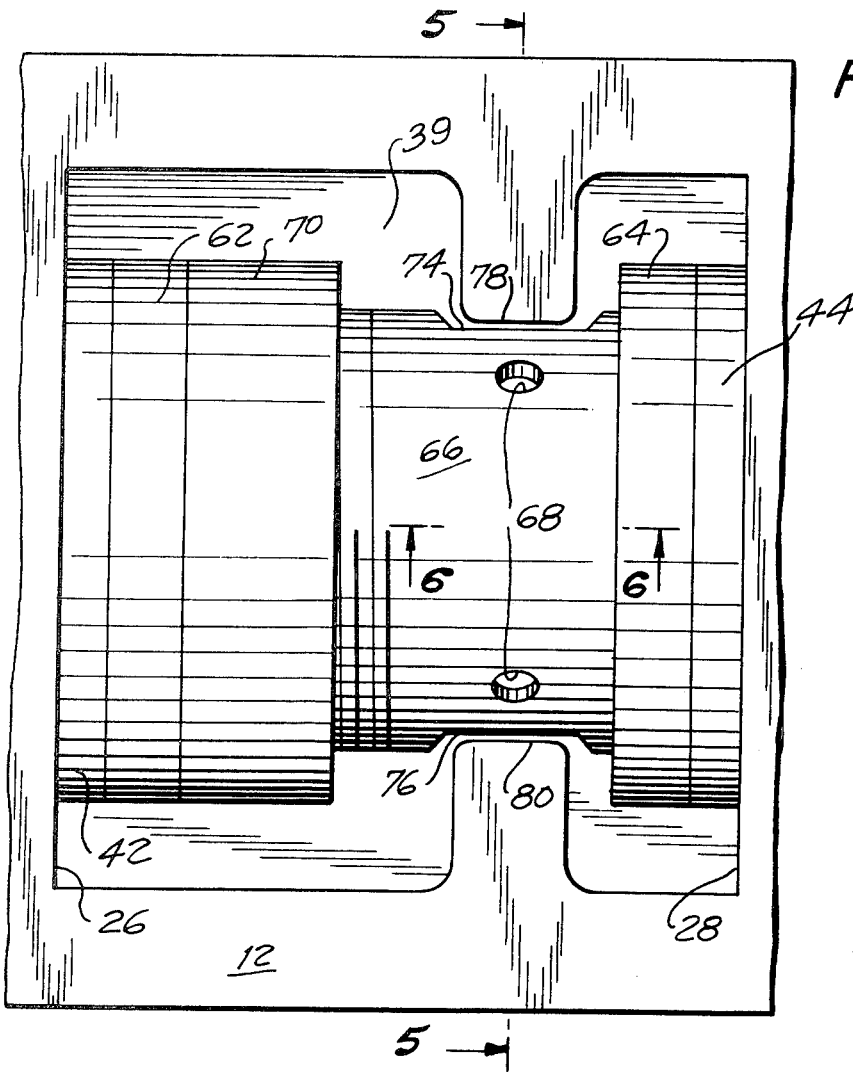
FIG. 4 is a top plan view of the means for preventing the threaded valve sleeve from rotating.
Figure 6:
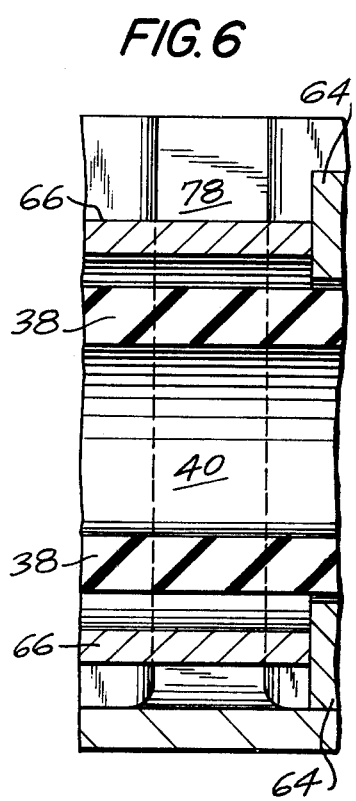
FIG. 6 is a sectional view taken substantially along the line 6—6 of FIG. 4.
Figure 5:
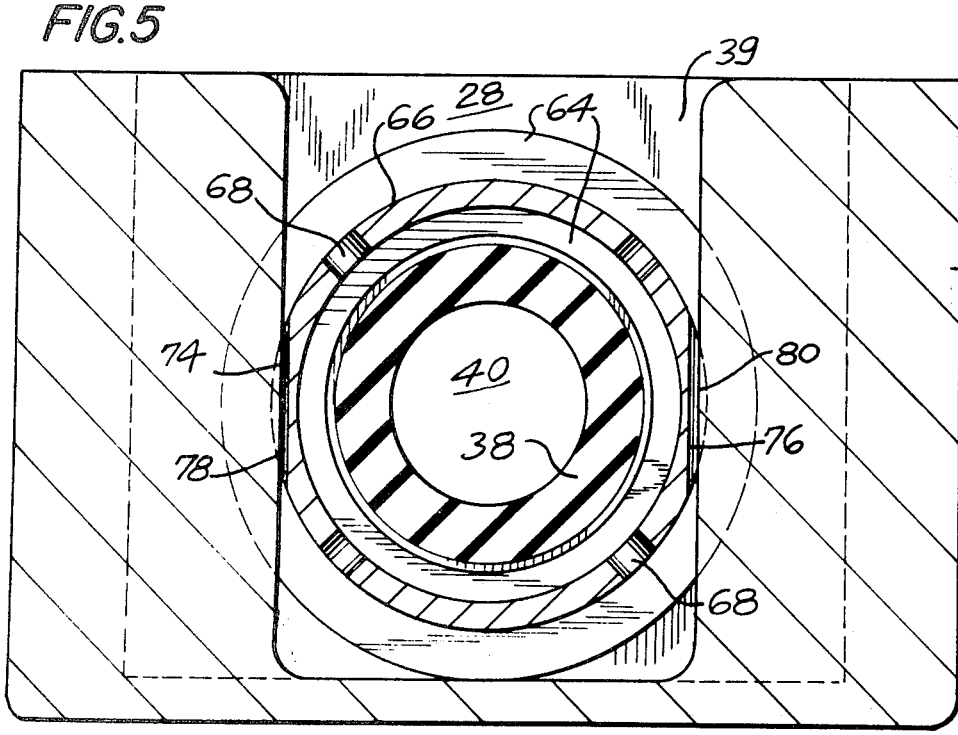
FIG. 5 is a sectional view taken substantially along the line 5—5 of FIG. 4.

It will be recalled that threaded valve sleeve jacket 66 is prevented from rotating as seen in FIGS. 4 and 5. As a consequence thereof, faces 50 and 46 of, respectively, flanges 44 and 42 are forced against faces 28 and 26 of valve housing 12 thereby ensuring an excellent seal. If there is a leakage, it is to chamber 39. It should be noted that the pinch valve sleeve is not secured to the pipe.

When it is desired to remove a pinch valve sleeve and the associated thrust washers, threaded valve sleeve jacket and nut, the cover 14 is removed. Any leakage of fluid which is transported through the pinch valve sleeve is received within the valve housing 12. This is particularly desirable if the fluid is radioactive.

When it is desired to control the flow of fluid through pinch valve sleeve 38, a source of fluid under pressure is connected to threaded inlet 86. The fluid under pressure passes through opening 68 constricting pinch valve sleeve 38 the desired amount whereby the flow of fluid through said pinch valve sleeve is controlled.

If desired, a mechanical means can be provided for constricting pinch valve sleeve 38 in lieu of a fluid actuating means.

An important feature of the present invention is that the pinch valve sleeve can be installed and/or removed without removing the pinch valve construction from the pipeline.

It should be noted that the pipe section need not be welded to the valve housing and can be bolted or otherwise secured to the valve housing.

As will be apparent to those skilled in the art, the pinch valve construction just described is particularly suitable for controlling the flow of radioactive fluid inasmuch as the chances of leakage are eliminated.

Having thus described the invention, there is claimed as new and desired to be secured by Letters Patent:

1. An improved pinch valve construction comprising a unitary hollow pinch valve housing, one end of said pinch valve housing having a pipe receptacle, said valve housing having an internal chamber spaced away from said one end of said pinch valve housing so that said chamber is spaced away from said pipe receptacle, flexible pinch valve sleeve means located within said chamber, a first end of said pinch valve sleeve means being spaced from said pipe receptacle and affixed to the inner wall of said pinch valve housing, said housing having an opening so that a passage for fluid flow is provided from said pipe receptacle through said opening and into said pinch valve sleeve means, internal means within said housing for urging the opposed first and second end portions of said pinch valve sleeve means against respective inner wall portions of said valve housing, said urging means including means for respectively forcing said first end portion of said pinch valve sleeve means against said valve housing adjacent and about the periphery of said opening, and for forcing said second end portion of said pinch valve sleeve means against said valve housing, said forcing means including a first thrust washer and a second thrust washer, said pinch valve sleeve means first end portion being a first flange, said first thrust washer abutting against said first flange, said pinch valve sleeve means second end portion being a second flange, said second thrust washer abutting against said second flange, a threaded valve sleeve jacket circumscribing said pinch valve sleeve means, a nut in engagement with said threaded valve sleeve jacket and adapted to abut against one of said thrust washers, and internal means for constricting said pinch valve sleeve means.

2. An improved pinch valve construction according to claim 1 wherein said pinch valve housing includes a casing and a cover, and means for selectively attaching said cover to said casing whereby said pinch valve sleeve means can be removed from said pinch valve casing when said cover is removed from said casing.

3. An improved pinch valve construction according to claim 1 wherein said first flange includes a stub, said first thrust washer including an indentation for receiving the stub of said first flange.

4. An improved pinch valve construction according to claim 1 wherein said second flange includes a stub, said second thrust washer including an indentation for receiving the stub of said second flange.

5. An improved pinch valve construction according to claim 1 wherein a passageway is provided through said threaded valve sleeve via which a fluid under pressure can be directed about said pinch valve sleeve.

6. An improved pinch valve sleeve according to claim 1 wherein means is provided for substantially preventing said threaded pinch valve sleeve jacket from rotating relative to said housing.

7. An improved pinch valve sleeve according to claim 6 wherein said preventing means includes at least one flat exterior surface portion of said threaded valve sleeve jacket, and means extending inwards from said housing which cooperates with said flat exterior surface portion to substantially prevent said threaded valve sleeve jacket from rotating relative to said housing.

* * * * *